No. 643,198. Patented Feb. 13, 1900.
A. G. PAUL.
APPARATUS FOR DISCHARGING WATER AND AIR FROM CYLINDER DRIERS.
(Application filed Apr. 13, 1896. Renewed July 18, 1899.)
(No Model.) 3 Sheets—Sheet 1.
Fig. 1,
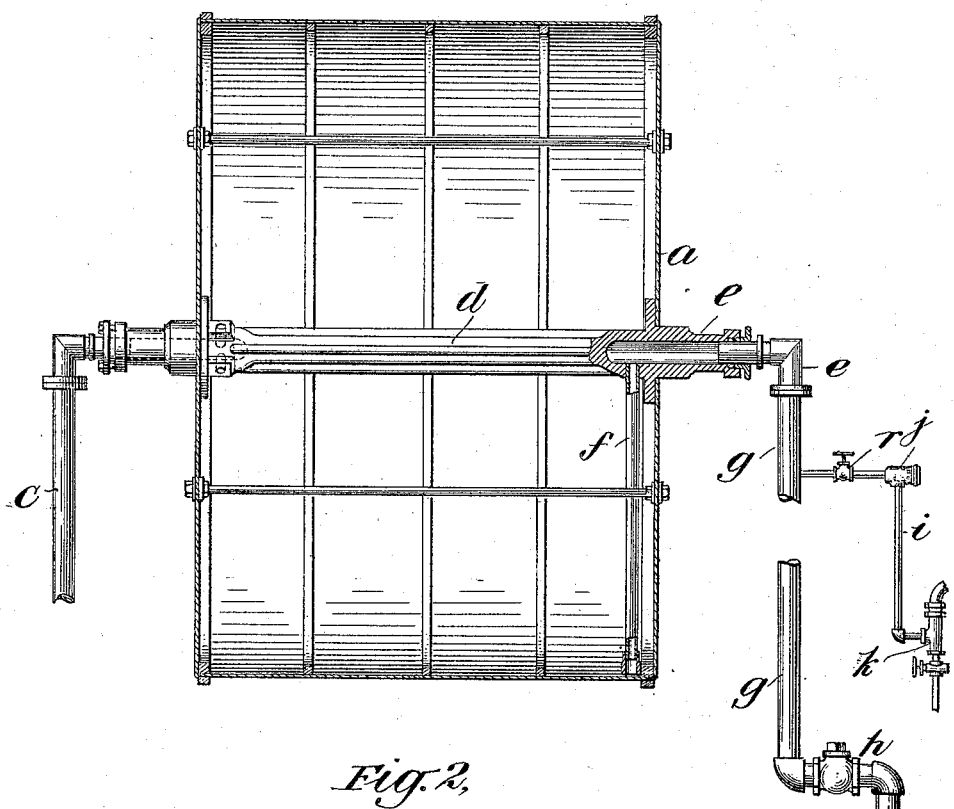
Fig. 2,
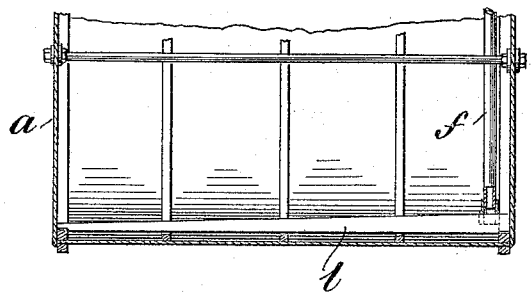
WITNESSES:
Charles J. Pupki
Geo. W. Mill Jr.
INVENTOR
Andrew G. Paul,
BY
Witter & Kenyon,
ATTORNEYS.

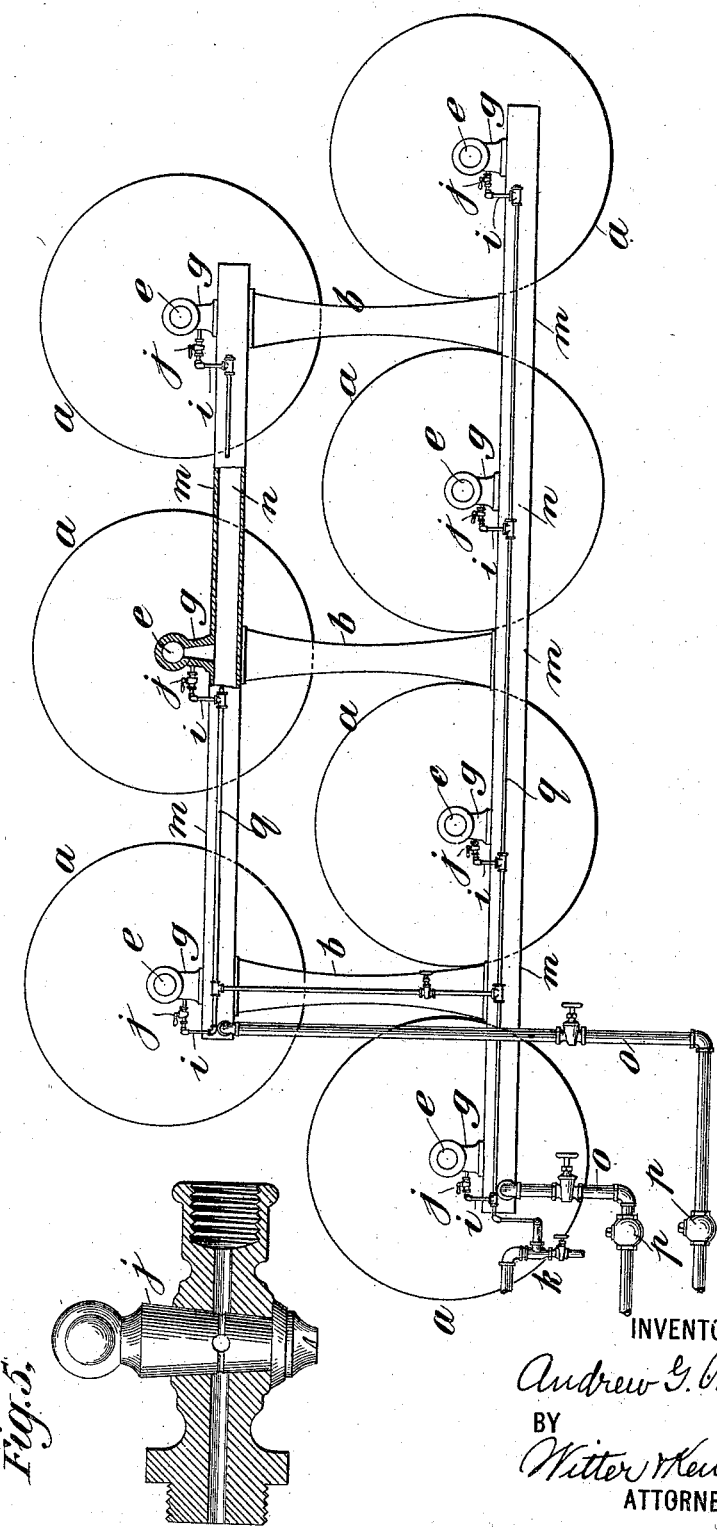

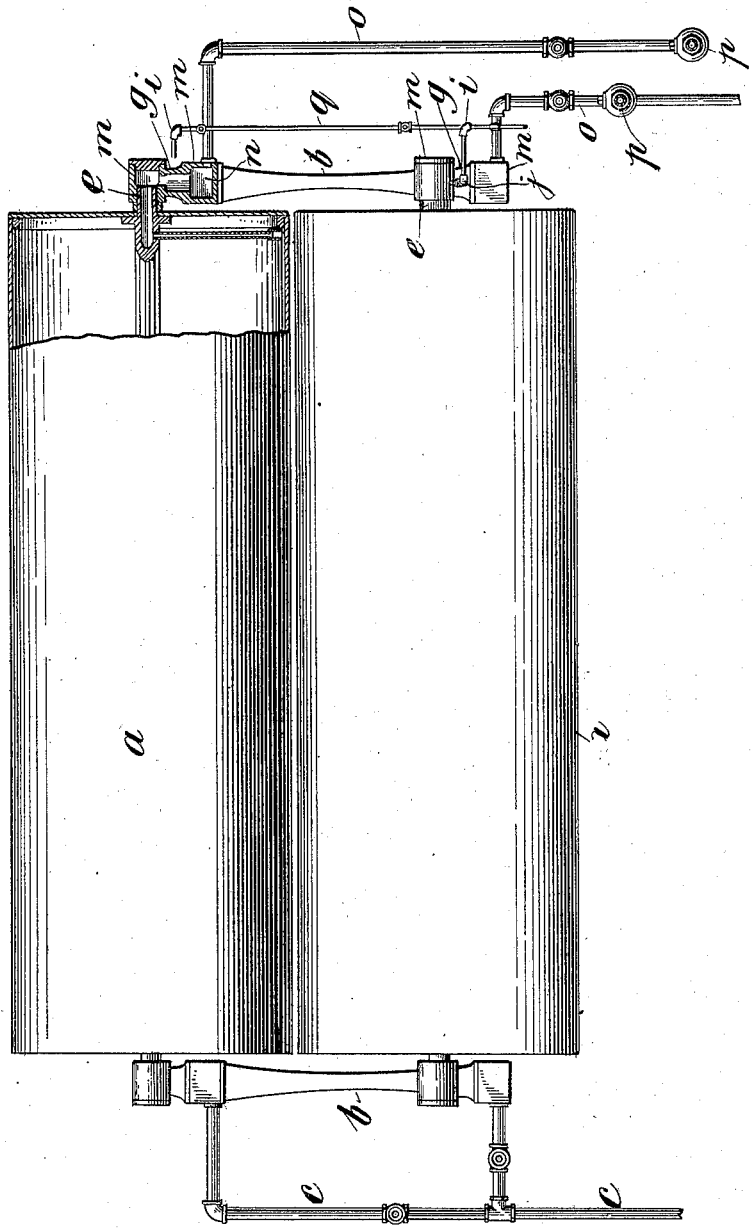

UNITED STATES PATENT OFFICE.

ANDREW G. PAUL, OF BOSTON, MASSACHUSETTS.

APPARATUS FOR DISCHARGING WATER AND AIR FROM CYLINDER-DRIERS.

SPECIFICATION forming part of Letters Patent No. 643,198, dated February 13, 1900.

Application filed April 13, 1896. Renewed July 18, 1899. Serial No. 724,300. (No model.)

*To all whom it may concern:*

Be it known that I, ANDREW G. PAUL, a citizen of the United States, and a resident of Boston, in the county of Suffolk and State of Massachusetts, have invented a new and useful Apparatus for Discharging Hot Water and Air from the Cylinders of Drying and Heating Machines, of which the following is a full, clear, and exact specification, reference being had to the accompanying drawings, which form a part hereof.

This invention relates to means for removing the water of condensation and the air from the cylinder or cylinders of a machine for heating or drying, such as a paper or cloth or yarn drying machine; and its object is to completely and constantly remove the air and water from the cylinders and to keep them dry and free from air, and thereby to increase their efficiency and regularity of operation and to do this by an apparatus which is simple and economical in construction.

The invention consists, first, in the combination, with such a drying or heating cylinder and a suitable supply-pipe, of an outlet-pipe connected with one of the journals of the cylinder and provided with an inner leg adapted to revolve with the cylinder, and an escape-pipe connected with the outlet-pipe, above the outer end thereof, whereby when the inner end of the outlet-pipe is below the level of the water in the cylinder the water is caused to flow out through that pipe and at other times the air in the cylinder is discharged therethrough.

The invention also consists in the combination, with the parts above named, of a restricted passage in the escape-pipe and an exhausting device connected with that pipe.

The invention also consists in the combination, with the other necessary parts, of a scoop connected with the inner leg of the outlet-pipe, whereby a quantity of water is carried up by said scoop in its revolution and caused to flow out though the outlet.

The invention also consists in the combination, with the escape-pipe, of a restricted passage therein, consisting of a thermostatic valve adapted to further restrict the passage when steam or hot water enters it.

The invention also consists in the combination, with two or more drying or heating cylinders, of separate outlet-pipes, one for each cylinder, a common discharge pipe or main into which each of the former empties, a trap at the outer end of the common discharge pipe or main, and an escape-pipe having branches connected with each of the separate outlet-pipes, each branch being provided with a restricted passage, and an exhausting device connected with the escape-pipe. In place of having one escape-pipe with branches several escape-pipes may be used, each provided with an exhauster.

The invention also consists in the combination, with the parts named in the preceding paragraph, of an inner leg in each outlet-pipe adapted to revolve with the cylinder.

The invention also consists in other features of construction and combinations of parts hereinafter described and claimed.

The invention is illustrated in the accompanying drawings, in which—

Figure 1 is a cross-sectional view of a drying-cylinder for drying yarn, commonly known as a "slasher," having my improvements applied thereto. Fig. 2 is a partial detail view of a similar cylinder, showing a scoop connected with the outlet-pipe. Fig. 3 is a side view of a drying-machine containing seven drying-cylinders, showing the connections on the outlet side of the machine. Fig. 4 is an end view of the machine in Fig. 3, showing the connections at both ends of the cylinders and partly broken away to show the hollow frame, the end of the air-pipe, with the exhauster, not being shown. Fig. 5 is a detail view of a plug-valve adapted for use on the escape-pipe.

Referring to Fig. 1, *a* is a drying-cylinder having journals adapted to be mounted in suitable bearings in the frame of the machine and adapted to revolve on these journals. The journals are hollow. The cylinder can be of any ordinary or suitable construction. The form shown in Fig. 1 is that of a slasher or drying-can for drying yarn. *c* is the supply-pipe for admitting the steam. It passes through one of the journals.

*d* is a shaft or rod for supporting and strengthening the cylinder. It is grooved or recessed at the supply end, as shown, to admit the steam. The outlet-pipe consists of the inner leg *f*, the middle portion *e*, formed by a recess in the shaft $d$ and by the hollow journal, and the outer leg $g$. The inner leg is so connected or fastened to the shaft $d$ or the cylinder as to revolve with the cylinder. In the form shown the inner leg $f$ is screwed into the shaft $d$, so as to connect with the recess in that shaft. The outer leg $g$ of the outlet-pipe is connected with the hollow journal by any suitable coupling.

$h$ is a trap at the outer end of the outlet-pipe consisting of an ordinary check-valve.

$i$ is an escape-pipe. $j$ is a restricted passage in that pipe. It may be made by a capillary plug-valve, such as is shown in Fig. 5, which is described and claimed in my previous patent, No. 563,879, dated July 14, 1896.

In the best form of my invention I employ a thermostatic valve as the means of forming the restricted passage. Any suitable form of thermostatic valve may be used, although I prefer to use the thermostatic valve for which I have previously filed an application for United States Letters Patent, Serial No. 581,024. This thermostatic valve is so constructed and arranged that when it is in normal condition it will provide a passage of such a size as to permit the air and gases to flow out through the escape-pipe at the proper rate of speed, and when it is raised in temperature as a result of the passage through it of steam or hot water it will make the passage still smaller, and thereby decrease or entirely shut off the flow through the valve. In ordinary cases when the valve is in its normal condition the expanding member will be distant from its seat about two one-hundredths of an inch, and as this expanding member is usually about one-quarter of an inch in diameter the restricted passage will be about an inch long and two one-hundredths of an inch in width. As the special construction of such a thermostatic valve is well understood and in itself forms no part of this invention, I have not shown it in detail in the drawings, but have represented it by the letter $j$ in Fig. 1.

$k$ is an exhausting device connected with the escape-pipe. Any suitable form of exhauster may be used; but I prefer to employ a jet, such as a steam-jet or a water-jet. The escape-pipe is generally provided with an ordinary valve or cock $r$ for shutting off the pipe when desired. It will be readily understood that the supply-pipe may be connected with the same journal of the cylinder as the outlet-pipe instead of being connected with the opposite journal. The inner leg $f$ of the outlet-pipe should be extended to within a short distance of the curved wall of the cylinder.

The operation of the apparatus is as follows: When the cylinder is first started, it is full of air. It is necessary to remove this air, and to accomplish this result the escape-pipe is opened, and when an exhauster is used it is started. The air contained within the cylinder will pass out through this escape-pipe. At the same time the valve in the steam-supply pipe is opened and a supply of steam is admitted to the cylinder. The steam at once begins to condense and the water of condensation drops or flows down to the bottom of the cylinder and collects at that point. The inner leg of the outlet-pipe is meanwhile revolving with the cylinder. As soon as a sufficient quantity of water has collected in the lower part of the cylinder to seal the inner end of the outlet-pipe when in its revolution its inner end is brought to the lowest part of the cylinder the water will be caused to flow up through the inner leg of the outlet-pipe and through the middle part thereof and will flow down to the bottom of the outer leg and collect at that point. As the inner leg continues its revolution its lower end will be unsealed and the air and gases in the higher parts of the cylinder above the water will be caused to flow out through the outlet-pipe and through the escape-pipe. Thus the air and gases and water are removed through the same outlet-pipe. The exhauster tends to create a partial vacuum or a low pressure in the escape-pipe between itself and the restricted passage. As a result of this decreased pressure the air and some of the other contents of the outlet-pipe will slowly pass out through the restricted opening of the escape-pipe. I have found that as a result of this the water of condensation or the air and gases will be discharged from the cylinder through the outlet-pipe, water being discharged when the end of the inner leg is sealed by the water in the cylinder and air and gases being discharged at other times. The air is given off from the heating agent at the place of condensation—that is, at or near the interior surface of the cylinder. By revolving the inner leg of the outlet-pipe its open end is moved around through the contents of the cylinder, at a point near the interior surface thereof, and therefore at the point where the air is given off in the largest quantities. The air therefore is very thoroughly and effectively removed. When the thermostatic valve is used to form the restricted passage, it remains in its normal condition so long as the cold air is passing through it; but when steam or hot water reaches the valve the opening is still further restricted, and the quantity of matter escaping through the valve is thereby reduced or the valve may be entirely shut off. It is important to have the restricted passage of its full normal size when the machine is first started and when nothing but air is passing out through the escape-pipe. It is also an advantage to have the size of the opening reduced when the steam or the hot water has entered the escape-pipe and come in contact with the valve.

This invention not only removes the air and gases and water of condensation thoroughly and completely from the cylinder, and thus enables it to work at its full efficiency and with steam at atmospheric pressure or less, but it also reduces the amount of piping necessary in constructing and arranging the machine and involves the use of only one connection with the machine besides that of the supply-pipe.

In Fig. 2 a modification is shown in which the cylinder is provided with a scoop $l$, connected with the inner end of the outlet-pipe. This scoop assists the operation of the outlet-pipe by scooping up a quantity of water and causing it to flow into the outlet-pipe while the scoop is passing from its lowest to its highest position. The action of the scoop does not, however, interfere with the operation of the outlet-pipe in discharging the air and gases.

In Figs. 3 and 4 a drying-machine is shown comprising a number of drying-cylinders $a\ a$, having journals mounted in suitable bearings in the frame $b$. These drying-cylinders are constructed in substantially the same manner as the cylinder shown in Fig. 1. $c$ is the supply-pipe for admitting the steam or heating agent. It has suitable branches connecting it with each of the cylinders through the hollow journals on one side of the machine. There is a separate outlet-pipe connected with the opposite journal of each cylinder. The inner leg of each of these outlet-pipes and the middle portion $e$ are constructed the same as shown in Fig. 1. The outer legs $g$ of the outlet-pipes communicate with the common pipe or main $n$, which forms a part of the frame of the machine and which connects with the discharge-pipe $o$, provided with the trap $p$. This common outlet or discharge main connects the lower ends of the separate outlet-pipes and has a discharge-pipe $o$, provided with a trap $p$. I prefer to use an ordinary check-valve for this purpose. $i\ i$ are escape-pipes connected with the separate outlet-pipes, as shown. These escape-pipes are provided with restricted passages $j\ j$. These escape-pipes preferably connect with a common escape-pipe $q$, with which an exhausting device, preferably a steam or water jet $k$, is connected. Instead of joining the escape-pipes $i\ i$ by means of the common escape-pipe $q$ these escape-pipes may be separate, and each one may be provided with an exhausting device; but I prefer the form shown.

In the form shown in Figs. 3 and 4 there are two tiers of drying-cylinders. The upper and lower tiers have separate outlet mains $n$ and separate discharge-pipes $o$.

The operation of the form shown in Figs. 3 and 4 is the same as that already explained in connection with Figs. 1 and 2, except that the separate outlet-pipes are not provided with separate traps, only one trap being used with each tier and that being placed at the outer end of the discharge-pipe.

I have found that by means of this apparatus the air and gases and water will be thoroughly and successfully removed from the drying-cylinders and that they will be made to work to their full efficiency with steam at atmospheric pressure or less and that the temperature of the cylinders will be kept substantially uniform, and the quality of work performed will thereby be improved.

What I claim as new, and desire to secure by Letters Patent, is—

1. The combination of a drying or heating cylinder, an outlet-pipe connected with one of the journals thereof provided with an inner leg adapted to revolve with the cylinder, and an escape-pipe connected with the said outlet-pipe above the outer end thereof, substantially as set forth.

2. The combination of a drying or heating cylinder, an outlet-pipe connected with one of the journals thereof provided with an inner leg adapted to revolve with the cylinder, an escape-pipe connected with the said outlet-pipe above the outer end thereof, and an exhausting device with which said escape-pipe is connected, substantially as set forth.

3. The combination of a drying or heating cylinder, an outlet-pipe connected with one of the journals thereof provided with an inner leg adapted to revolve with the cylinder, and an escape-pipe connected with the said outlet-pipe above the outer end thereof, the said escape-pipe being provided with a restricted passage, substantially as set forth.

4. The combination of a drying or heating cylinder, an outlet-pipe connected with one of the journals thereof provided with an inner leg adapted to revolve with the cylinder, and an escape-pipe connected with the said outlet-pipe above the outer end thereof, the said escape-pipe being provided with a restricted passage, and an exhausting device with which said escape-pipe is connected, substantially as set forth.

5. The combination of a drying or heating cylinder, an outlet-pipe connected with one of the journals thereof provided with an inner leg adapted to revolve with the cylinder, a trap at the outer end of said outlet-pipe, and an escape-pipe connected with the said outlet-pipe above the outer end thereof, substantially as set forth.

6. The combination of a drying or heating cylinder, an outlet-pipe connected with one of the journals thereof provided with an inner leg adapted to revolve with the cylinder, a trap at the outer end of said outlet-pipe, an escape-pipe connected with the said outlet-pipe above the outer end thereof, and an exhausting device with which said escape-pipe is connected, substantially as set forth.

7. The combination of a drying or heating cylinder, an outlet-pipe connected with one of the journals thereof provided with an inner leg adapted to revolve with the cylinder, a trap at the outer end of said outlet-pipe, and an escape-pipe connected with the said outlet-pipe above the outer end thereof, the said escape-pipe being provided with a restricted passage, substantially as set forth.

8. The combination of a drying or heating cylinder, an outlet-pipe connected with one of the journals thereof provided with an inner leg adapted to revolve with the cylinder, a trap at the outer end of said outlet-pipe, and an escape-pipe connected with the said outlet-pipe above the outer end thereof, the said escape-pipe being provided with a restricted passage, and an exhausting device with which said escape-pipe is connected, substantially as set forth.

9. The combination of a drying or heating cylinder, an outlet-pipe connected with one of the journals thereof provided with an inner leg adapted to revolve with the cylinder, a scoop connected with said inner leg, a trap at the outer end of said outlet-pipe, and an escape-pipe connected with the said outlet-pipe above the outer end thereof, the said escape-pipe being provided with a restricted passage, and an exhausting device with which said escape-pipe is connected, substantially as set forth.

10. The combination of a drying or heating cylinder, an outlet-pipe connected with one of the journals thereof provided with an inner leg adapted to revolve with the cylinder, and an escape-pipe connected with the said outlet-pipe above the outer end thereof, the said escape-pipe being provided with a restricted passage consisting of a thermostatic valve, substantially as set forth.

11. The combination of a drying or heating cylinder, an outlet-pipe connected with one of the journals thereof provided with an inner leg adapted to revolve with the cylinder, and an escape-pipe connected with the said outlet-pipe above the outer end thereof, the said escape-pipe being provided with a restricted passage consisting of a thermostatic valve, and an exhausting device with which said escape-pipe is connected, substantially as set forth.

12. The combination of a drying or heating cylinder, an outlet-pipe connected with one of the journals thereof provided with an inner leg adapted to revolve with the cylinder, a trap at the outer end of said outlet-pipe, and an escape-pipe connected with the said outlet-pipe above the outer end thereof, the said escape-pipe being provided with a restricted passage consisting of a thermostatic valve, substantially as set forth.

13. The combination of a drying or heating cylinder, an outlet-pipe connected with one of the journals thereof provided with an inner leg adapted to revolve with the cylinder, a trap at the outer end of said outlet-pipe, and an escape-pipe connected with the said outlet-pipe above the outer end thereof, the said escape-pipe being provided with a restricted passage consisting of a thermostatic valve, and an exhausting device with which said escape-pipe is connected, substantially as set forth.

14. The combination of a drying or heating cylinder, an outlet-pipe connected with one of the journals thereof, an escape-pipe connected with the said outlet-pipe above the outer end thereof, the said escape-pipe being provided with a restricted passage consisting of a thermostatic valve, substantially as set forth.

15. The combination of two or more drying or heating cylinders, separate outlet-pipes one connected with each cylinder, a common discharge pipe or frame, a trap at the outer end of the common discharge-pipe, an escape-pipe connected with each of the separate outlet-pipes from the cylinders, and provided with a restricted passage, and an exhausting device or devices connected with the escape-pipes, substantially as set forth.

16. The combination of two or more drying or heating cylinders, separate outlet-pipes, one connected with each cylinder, each outlet-pipe having an inner leg adapted to revolve with the cylinder, a common discharge pipe, a trap at the outer end of the common discharge-pipe, an escape-pipe connected with each of the separate outlet-pipes from the cylinders, and an exhausting device or devices connected with the escape-pipes, substantially as set forth.

17. The combination of two or more drying or heating cylinders, separate outlet-pipes, one connected with each cylinder, each outlet-pipe having an inner leg adapted to revolve with the cylinder, a common discharge-pipe, a trap at the outer end of the common discharge-pipe, an escape-pipe connected with each of the separate outlet-pipes from the cylinders and provided with a restricted passage, and an exhausting device or devices connected with the escape-pipes, substantially as set forth.

18. The combination of the drying or heating cylinders $a, a$, the supply-pipe $c$, the outlet-pipes each provided with an inner leg adapted to revolve with the cylinder, the hollow frame provided with the common outlet-pipe or discharge $n$, the trap $p$, the escape-pipes $i, i$, provided with the restricted passages $j j$, and the exhausting device $k$, substantially as set forth.

In testimony whereof I have signed my name to this specification in the presence of two subscribing witnesses.

ANDREW G. PAUL.

Witnesses:
E. A. JAMES,
THOS. W. ANDREW.